March 3, 1970  L. Q. DE PUY  3,498,646

TUBE COUPLING

Filed April 29, 1968

INVENTOR
LELAND Q. DEPUY

ATTORNEY
John N. Wolfram

United States Patent Office 3,498,646
Patented Mar. 3, 1970

3,498,646
TUBE COUPLING
Leland Q. DePuy, Cleveland, Ohio, assignor to Parker-Hannifin Corporation, Cleveland, Ohio, a corporation of Ohio
Filed Apr. 29, 1968, Ser. No. 724,702
Int. Cl. F16l 17/00, 19/00, 21/00
U.S. Cl. 285—339                                    2 Claims

ABSTRACT OF THE DISCLOSURE

A tube coupling joint in which a ferrule is threaded onto a tube. The tube has a smooth cylindrical surface axially inward of the thread and the ferrule carries a packing on its inside diameter in a position to overlie the smooth surface of the tube. The coupling body has a tapered wall that contracts the inner end of the ferrule to force the packing into tight sealing engagement with the smooth cylindrical surface of the tube.

BACKGROUND OF THE INVENTION

This invention is an improvement in the tube coupling shown in Patent 3,326,582. The patent discloses a tube coupling in which a ferrule is threaded upon a tube and has a smooth bore portion inwardly of the threads that is contracted into sealing engagement with a smooth cylindrical surface of the tube by a tapered wall in the coupling body. The coupling is particularly adaptable for very high pressures wherein the tube wall thickness is so great that the tube cannot be readily flared. The threaded engagement between the ferrule and tube provides high holding strength for retaining the tube within the coupling and the engagement of the smooth surfaces of the ferrule and tube provide a fluid seal.

Although the coupling disclosed in the patent is very effective for many installations, it is sometimes difficult to obtain an adequate seal by the metal to metal contact between the ferrule and tube, as for example, when insufficient care is taken in the field to machine a sufficiently smooth surface on the tube or to protect the same against scratches and other damage.

SUMMARY OF THE INVENTION

The present invention solves the difficulty just described by providing a coupling joint similar to that disclosed in the above mentioned patent but in which a resilient packing is utilized to assure a tight seal between the ferrule and tube. The packing is mounted in a recess in the front end of the ferrule and is forced into tight sealing engagement with the smooth portion of the tube when the front end of the ferrule is contracted by the body member. The recess is so located that the ferrule engages the tube in metal to metal contact on both sides of the recess to prevent extrusion of the packing from the recess during makeup of the coupling and when the joint is subjected to high pressure.

DESCRIPTION OF THE INVENTION

Figure 1:
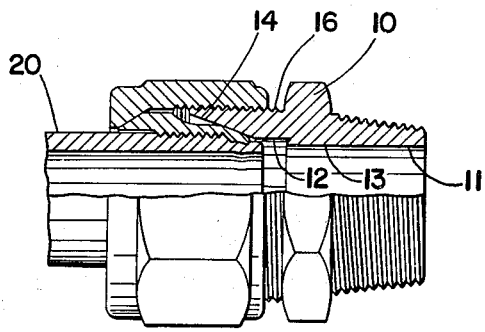
FIGURE 1 is a view partly in longitudinal cross section of the assembled tube coupling joint.

The joint includes a body 10 having a bore 11 and a counterbore 12 that is inward of a tapered wall 14. The body has an external thread 16.

A tube 20 has a smooth cylindrical surface 21 at its inner end followed by an external thread 22 whose major diameter is substantially the same as outer diameter 23 of the tube and whose minor diameter is substantially the same, or slightly larger, than the diameter of surface 21.

A ferrule 25 having an inner end portion 26 and an internally threaded portion 28 is threaded onto the tube. The rear end of the ferrule has a smooth walled cylindrical counterbore 29 slightly larger in diameter than outside diameter 23 of the tube and also either substantially the same as or slightly larger than the major diameter of internal thread 28.

Ferrule front end portion 26 has a taper 32 on its radially outer surface that is substantially the same taper as that of wall 14 and it also has a recess 33 formed in its inner surface a distance back of the inner end of the ferrule so as to provide an inwardly directed flange 34. Recess 33 is also preferably spaced a slight distance from the inner end of internal thread 28 so that the rear side wall 36 of the recess will be uninterrupted and have an inner diameter that is initially substantially the same as the inner diameter of flange 34. These diameters are slightly larger than the outer diameter of tube cylindrical surface 21.

Contained within recess 33 is an O-ring of Teflon or other resilient or elastomeric material and whose volume is substantially equal to the volume of the recess. The O-ring initially projects a slight distance from the recess.

A nut 40 is threaded onto body 10 and has a tapered shoulder 42 that engages a tapered shoulder 36 on the ferrule.

OPERATION

Figure 2:
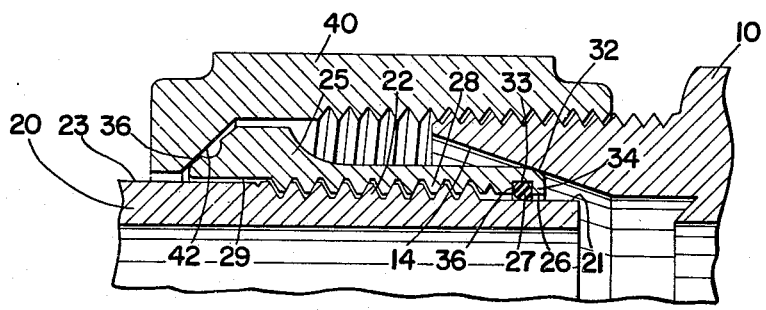
FIGURE 2 is an enlarged fragmentary section view showing the coupling parts in lossely assembled position.

To make up the joint, the nut 40 is slipped over the tube and ferrule 25 is then threaded upon the tube. The nut is then threaded upon the body to achieve the loosely assembled condition shown in FIGURE 2.

Figure 3:
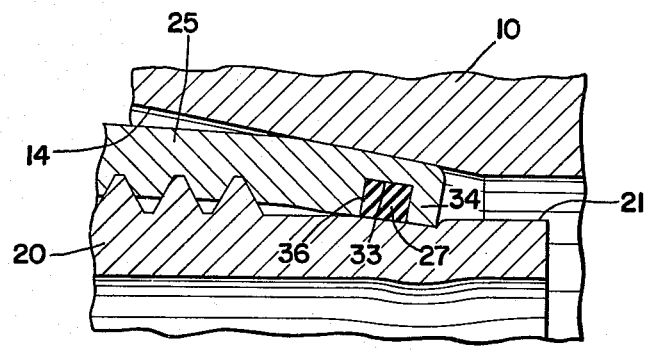
FIGURE 3 is a still further enlarged fragmentary section view showing the coupling parts tightly assembled.

Upon further tightening of the nut upon the body, tapered body wall 14 contracts the front end portion 26 of the ferrule to the final assembly position shown in FIGURE 3. In this position packing 37 is deformed into tight sealing engagement with tube cylindrical portion 21 and substantially fills recess 34. Also, the front end of the ferrule contacts the smooth cylindrical portion 21 on both sides of the recess to prevent extrusion of the packing from the recess. Although pressure within the coupling would tend to extrude the packing from the recess only along the axially outer edge of the latter, contact of flange 34 prevents forward extrusion of the packing while the joint is being tightened, such contact by the flange occurring before the final assembly position is reached and before the edge of rear wall 36 contacts the tube. Flange 34, being of relatively narrow axial width, digs into the tube to permit the edge of wall 36 to make tight contact with the tube. There also may be a slight bending of the ferrule at the bottom of recess 33 to permit metal to metal contact of the ferrule with the tube on both sides of the recess. Taper 32 on the ferrule extends to a location substantially opposite recess wall 36 to assure that there will be continuous contracting pressure applied by tapered wall 14 to the entire portion of the ferrule radially outward of recess 33 for achieving such metal to metal contact.

I claim:
1. A tube coupling joint comprising a tube having an external thread and having a smooth cylindrical outer surface between the thread and an end of the tube, a body member having an opening with a tapered wall, a ferrule having a bore therethrough on the tube and having an internal thread in a portion of the bore spaced from the inner end of the ferrule and engaged with said external thread, said ferrule having a radially contractable inner portion forwardly of said external thread and engageable with said tapered wall, a recess in said inner portion opening into said bore and axially spaced from both said ferrule inner end and from said external thread, a resilient packing within said recess and overlying said smooth cylindrical surface, and a clamping member interengaged with the body member and engageable with the ferrule for moving the ferrule toward the body member whereby said ferrule inner portion is radially contracted by said wall to engage said cylindrical surface on both sides of said recess and said packing is forced into tight sealing engagement with said cylindrical surface.

2. The joint of claim 1 in which said recess is located in the forward part of said inner portion, and said inner portion is engaged by the body wall, axially, on both sides of said recess for contracting said inner portion.

References Cited

UNITED STATES PATENTS

| | | | |
|---|---|---|---|
| 2,377,891 | 6/1945 | Laue | 285—342 |
| 2,617,485 | 11/1952 | Thatch | 285—341 X |
| 3,258,279 | 6/1966 | Johnsen | 285—341 X |
| 3,326,582 | 6/1967 | Currie | 285—341 |

DAVID J. WILLIAMOWSKY, Primary Examiner

W. L. SHEDD, Assistant Examiner

U.S. Cl. X.R.

285—341, 343